Patented May 29, 1945

2,377,111

UNITED STATES PATENT OFFICE 2,377,111

UNSATURATED CARBONATE ESTERS

Franklin Strain, Barberton, and Frederick E. Küng, Akron, Ohio, assignors to Pittsburgh Plate Glass Company, Pittsburgh, Pa., a corporation of Pennsylvania No Drawing. Application February 29, 1944, Serial No. 524,482

9 Claims. (Cl. 260—463)

This invention relates to new unsaturated esters having valuable properties and capable of polymerization to form new resinous compositions as hereinafter described. The new materials are esters of carbonic acid which contain one vinyl group ($CH_2=CH-$) and one alkyl group.

One purpose of this invention is to prepare new vinyl esters capable of polymerization to form transparent thermoplastic resins suitable for molding or casting into desired shapes.

A further purpose is to prepare carbonic acid esters in which a vinyl group is attached directly to the carbonate radical (—O—CO—O—). The new unsaturated carbonates have the following structural formula:

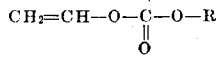

in which R represents an alkyl group which may be derived from any saturated monohydroxy alcohol such as methyl, ethyl, isopropyl, n-propyl, n-butyl, isobutyl, amyl, benzyl, lauryl, stearyl or cetyl alcohols.

Such esters derive their polymerizable characteristics from the vinyl group but the alkyl group appears to have a modifying effect. Accordingly, by variation of the particular alkyl group polymers of slightly different characteristics may be prepared. Generally, the esters with the shorter alkyl chains yield harder materials while the esters with the longer chains form slightly softer polymers. All of the esters are capable of being polymerized to clear solids which are thermoplastic.

The new esters may be prepared by the reaction of vinyl chloroformate with the desired saturated alcohol. Vinyl chloroformate is readily hydrolyzable and accordingly, the reaction should be conducted under conditions which minimize the hydrolysis. By using anhydrous reactants temperatures between 40° C. and the boiling point of the reaction mixture can be used.

During the reaction, hydrochloric acid is evolved and should be eliminated. For this purpose we prefer to use an alkaline reagent such as pyridine or other tertiary cyclic amine or an oxide, hydroxide or carbonate of an alkali metal or alkali earth metal. Such reagents are capable of combining chemically with the hydrochloric acid and eliminating it from the reaction zone. When a strong alkali such as an alkali metal hydroxide is used in the presence of water reaction temperatures of 20° C. or lower should be used. Since the reaction is exothermic artificial cooling must be used. The desired reaction temperatures are maintained by submerging the reaction vessel in an ice bath or by circulating refrigerated brine or other coolant through a jacket on the reaction vessel or through submerged coils. A mechanical stirring apparatus will facilitate dissipation of the heat of reaction.

Hydrolysis is further minimized by combining the reactants in such manner that neither the chloroformate nor the vinyl carbonate ester will exist in contact with any substantial excess of strong alkali. By slowly adding a stoichiometric mixture of the alcohol and the alkaline reagent to the vinyl chloroformate, or by adding separate streams of alkaline reagent and vinyl chloroformate to the alcohol, this objective will be achieved.

When relatively insoluble alkaline agents such as calcium carbonate are used, higher temperatures are required to obtain a satisfactory rate of reaction. Under such conditions it is very desirable to use anhydrous reactants or at least to minimize the water content.

The reaction should be conducted at such a rate that the desired temperature is maintained. If high temperatures and slightly soluble alkaline agents are used the rate at which the reactants are combined is of little importance. In the usual conduct of the operation employing either pyridine or water solutions of alkaline reagents at temperatures less than normal room temperature, it is necessary to add the reactants slowly. The rate of reaction may be readily controlled by watching the reaction temperature and mixing the reagents slowly enough to permit the complete dissipation of the heat of reaction and to maintain the temperature below a prescribed maximum.

After the reactants are completely mixed it is frequently desirable to stir the reaction mass for fifteen minutes to one hour in order to complete the reaction. The carbonate esters will form an immiscible layer if water is present. Where the reaction has been performed under substantially anhydrous conditions, a slurry of salt or pyridine hydrochloride in the carbonate ester will result. Addition of water to the slurry will dissolve the solids and create two distinct liquid phases. It is desirable to include a slight amount of hydrochloric or other mineral acid in the water to neutralize the excess of alkaline agent. The ester layer is quickly separated from the water layer and dried over anhydrous sodium sulphate. If desirable the ester may be washed one or more times with water or, preferably, with concentrated salt solutions, for example sodium bisulphate, before drying.

The more volatile of the esters may be further purified by distillation either at atmospheric pressure or at reduced pressures. Care should be taken to avoid polymerization during or shortly after distillation. Some of the esters polymerize slowly at higher temperatures. If distillation is contemplated at temperatures of 150 to 200° C. small amounts of polymerization inhibitors such as hydroquinone, pyrogallol, copper or copper salts can be added.

The vinyl chloroformate used in this esterification can be prepared by pyrolysis of ethylene glycol bis(chloroformate) at 300 to 600° C. and subsequently separated from by-products by distillation. This procedure is described and claimed in copending application Serial No. 504,292 (A-288) filed September 29, 1943, by Frederick E. Küng.

The new mixed vinyl carbonate esters are colorless liquids of relatively low viscosity. Upon heating, especially in the presence of hydrogen peroxide, organic peroxides or organic percarbonates, they gradually become more viscous and finally are converted into transparent colorless solids. The temperature required for polymerization depends upon the quantity and kind of peroxy compound. In general, peroxy compounds are effective catalysts at temperatures below 200° C. By heating above 200° C. it is possible to induce polymerization without adding catalysts, but under such conditions it is more difficult to secure transparent colorless resins.

The polymers of the new carbonate esters are useful in preparing molded compositions, castings, coating compositions, adhesives, impregnated fibrous compositions and many other articles now prepared from thermoplastic resins. It is also possible to modify the esters by copolymerizing them with vinyl acetate, vinyl chloride, maleic anhydride, styrene, butadiene, acrylonitrile, and other thermoplastic resins. Copolymerization with polyunsaturated esters is also contemplated.

Further details of the preparation and use of the new esters are set forth in the following specific examples:

Example I

A one liter reaction flask was provided with a stirring mechanism, a dropping funnel for the addition of reactants, and a thermometer for measuring the temperature within the flask. A bath of salt-ice mixture was also provided and the flask submerged therein. Two mols of vinyl chloroformate (212 g.) were placed in the flask and cooled to 0° C. A mixture of 100 g. ethyl alcohol and 375 cc. of 20 percent aqueous caustic soda (slight excess) was added dropwise from the dropping funnel at the rate of 5 cc. per minute until 150 cc. had been added and then as fast as possible without exceeding a reaction temperature of 10° C. The reaction mixture was stirred continuously to avoid local overheating. After all of the reactants had been combined, the mixture was stirred for 15 minutes to complete the reaction. Thereafter, the liquid was allowed to settle, two liquid phases were separated and the aqueous layer discarded. The ester layer was neutralized with a 15 percent hydrochloric acid solution and washed with four 150 cc. portions of saturated NaCl solution. After drying in contact with anhydrous sodium sulfate, the ester mixture was distilled and decolorized by heating with one gram of activated charcoal. A water-white liquid, ethyl vinyl carbonate, was thereby produced.

Example II

A mixture of 35 g. of methyl alcohol and 87 g. of pyridine (each 10 percent in excess of the stoichiometric amount) was placed in a 500 ml. flask equipped with stirring mechanism. Vinyl chloroformate (106 gms.) was introduced gradually at a rate which permitted the maintenance of the reaction temperature below +8° C. The flask was submerged in an ice bath throughout the reaction and the contents were stirred vigorously to assist the dissipation of the heat of reaction. When the reaction was complete, the precipitated pyridine hydrochloride and the excess pyridine were washed out with dilute hydrochloric acid. The ester was separated from the immiscible water layer and was washed with a saturated solution of sodium bisulfite and with a 100 cc. portion of water. Traces of water were removed by maintaining the ester in contact with sodium sulfate for 18 hours. After distillation to remove side reaction products, methyl vinyl carbonate was obtained as a colorless liquid.

Example III

Using the procedure of Example II except that n-butyl alcohol was used in place of methyl alcohol, a water white liquid ester, n-butyl vinyl carbonate, was obtained.

Example IV

Using the procedure of Example II, vinyl chloroformate was reacted with n-propyl alcohol to form a clear liquid n-propyl vinyl carbonate.

We have filed concurrently herewith an application, Serial No. 524,484 disclosing and claiming esters prepared by the reaction of vinyl chloroformate with hydroxy compounds, which application is generic to the scope of this application.

Although the invention has been described by reference to certain specific embodiments thereof, such details are not intended to be limitations on the scope of the invention as defined in the appended claims.

We claim:

1. A method of preparing mixed vinyl carbonate esters which comprises reacting vinyl chloroformate with a monohydroxy saturated alcohol.

2. A method of preparing mixed vinyl carbonate esters which comprises reacting equimolar proportions of vinyl chloroformate and an alkyl alcohol having at least two carbon atoms in the presence of an alkaline reagent at a temperature below 20° C.

3. A method of preparing vinyl ethyl carbonate which comprises reacting vinyl chloroformate with ethyl alcohol in the presence of an alkaline agent.

4. A method of preparing vinyl propyl carbonate which comprises reacting vinyl chloroformate with n-propyl alcohol in the presence of an alkaline agent.

5. A method of preparing vinyl butyl carbonate which comprises reacting vinyl chloroformate with n-butyl alcohol in the presence of an alkaline agent.

6. An ester having the structural formula

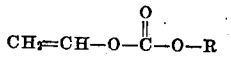

wherein R is an alkyl radical having at least two carbon atoms.

7. Vinyl ethyl carbonate.
8. Vinyl n-propyl carbonate.
9. Vinyl n-butyl carbonate.

FRANKLIN STRAIN.
FREDERICK E. KÜNG.